United States Patent
Park et al.

(10) Patent No.: US 12,002,986 B2
(45) Date of Patent: Jun. 4, 2024

(54) THIN POLYETHYLENE SEPARATOR WITH REDUCED COMPRESSIBILITY AND ELECTROCHEMICAL DEVICE INCLUDING THE SAME

(71) Applicant: LG CHEM, LTD., Seoul (KR)

(72) Inventors: Su-Jin Park, Daejeon (KR);
Chan-Jong Kim, Daejeon (KR);
Sang-Joon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 440 days.

(21) Appl. No.: 16/979,816

(22) PCT Filed: Jun. 21, 2019

(86) PCT No.: PCT/KR2019/007555
§ 371 (c)(1),
(2) Date: Sep. 10, 2020

(87) PCT Pub. No.: WO2019/245346
PCT Pub. Date: Dec. 26, 2019

(65) Prior Publication Data
US 2021/0050575 A1  Feb. 18, 2021

(30) Foreign Application Priority Data
Jun. 22, 2018 (KR) .................. 10-2018-0072384

(51) Int. Cl.
*H01M 50/411* (2021.01)
*H01M 10/0525* (2010.01)
(Continued)

(52) U.S. Cl.
CPC ..... *H01M 50/411* (2021.01); *H01M 10/0525* (2013.01); *H01M 50/403* (2021.01);
(Continued)

(58) Field of Classification Search
CPC ............ H01M 50/411; H01M 50/403; H01M 50/446; H01M 50/449
(Continued)

(56) References Cited

U.S. PATENT DOCUMENTS 5,240,655 A   8/1993  Troffkin et al.
5,281,491 A   1/1994  Rein et al.
(Continued)

FOREIGN PATENT DOCUMENTS

CN  103035864 A   4/2013
EP  2111912 A1 * 10/2009  ............. B01D 69/02
(Continued)

OTHER PUBLICATIONS

Extended European Search Report dated May 11, 2021 for corresponding EP Application No. 19822265.5.
(Continued)

*Primary Examiner* — Sean P Cullen
(74) *Attorney, Agent, or Firm* — Birch, Stewart, Kolasch & Birch, LLP

(57) ABSTRACT

A separator for an electrochemical device. The separator includes a porous substrate made of a porous polymer film having an excellent compressibility and permanent strain. The porous substrate has excellent physical strength and durability, and ensures a high breakdown voltage while using a heat resistant layer having a small thickness, and thus shows a low possibility of short-circuit generation. In addition, the separator may further include a heat resistant layer including inorganic particles, on the surface of the porous substrate. It is possible to further improve the compressibility, maximum compressibility and permanent strain characteristics depending on the types of inorganic particles.

8 Claims, 1 Drawing Sheet

(51) Int. Cl.
*H01M 50/403* (2021.01)
*H01M 50/409* (2021.01)
*H01M 50/443* (2021.01)
*H01M 50/446* (2021.01)
*H01M 50/449* (2021.01)
*H01M 50/489* (2021.01)
*H01M 50/491* (2021.01)

(52) U.S. Cl.
CPC ....... *H01M 50/409* (2021.01); *H01M 50/443* (2021.01); *H01M 50/446* (2021.01); *H01M 50/449* (2021.01); *H01M 50/489* (2021.01); *H01M 50/491* (2021.01)

(58) Field of Classification Search
USPC .......................................... 429/144, 251, 254
See application file for complete search history.

(56) References Cited

U.S. PATENT DOCUMENTS

| | | | |
|---|---|---|---|
| 6,080,507 A | | 6/2000 | Yu |
| 2006/0286439 A1* | 12/2006 | Fujikawa | ............ H01M 50/489 |
| | | | 429/231.95 |
| 2007/0190303 A1* | 8/2007 | Lee | ....................... B29C 55/005 |
| | | | 428/304.4 |
| 2009/0155677 A1 | 6/2009 | Maeda et al. | |
| 2009/0246614 A1 | 10/2009 | Kim et al. | |
| 2009/0286161 A1* | 11/2009 | Takita | ..................... B29C 48/90 |
| | | | 429/249 |
| 2012/0164538 A1* | 6/2012 | Inagaki | ............... H01M 50/494 |
| | | | 242/159 |
| 2013/0116355 A1* | 5/2013 | Kang | ...................... B29C 48/08 |
| | | | 521/143 |
| 2014/0045033 A1 | 2/2014 | Zhang et al. | |
| 2015/0037652 A1 | 2/2015 | Kim et al. | |
| 2015/0050545 A1 | 2/2015 | Murata et al. | |
| 2015/0372275 A1 | 12/2015 | Lee et al. | |
| 2016/0197327 A1 | 7/2016 | Li et al. | |
| 2016/0336569 A1* | 11/2016 | Mizuno | ................... B32B 3/266 |
| 2019/0252664 A1 | 8/2019 | Ishihara | |
| 2020/0127265 A1 | 4/2020 | Min et al. | |
| 2020/0303704 A1* | 9/2020 | Adams | ................ H01M 50/491 |

FOREIGN PATENT DOCUMENTS

| | | | | |
|---|---|---|---|---|
| JP | 2883726 B2 | 4/1999 | | |
| JP | 11-329390 A | 11/1999 | | |
| JP | 3235669 B2 | 12/2001 | | |
| JP | 2002-321323 A | 11/2002 | | |
| JP | 3422496 B2 | 6/2003 | | |
| JP | 2017-4903 A | 1/2017 | | |
| KR | 10-2009-0061571 A | 6/2009 | | |
| KR | 10-2009-0103011 A | 10/2009 | | |
| KR | 2013059783 A * | 6/2013 | ............ | C08J 5/2206 |
| KR | 10-2013-0097679 A | 9/2013 | | |
| KR | 10-2015-0042216 A | 4/2015 | | |
| KR | 10-2016-0002447 A | 1/2016 | | |
| KR | 10-2016-0126961 A | 11/2016 | | |
| KR | 2016129581 A * | 11/2016 | .......... | H01M 10/052 |
| KR | 10-2017-0089031 A | 8/2017 | | |
| KR | 10-2018-0039001 A | 4/2018 | | |
| WO | WO2015/194504 A1 | 12/2015 | | |
| WO | WO-2015194504 A1 * | 12/2015 | ................ | C08J 5/22 |
| WO | WO 2018/043331 A1 | 3/2018 | | |

OTHER PUBLICATIONS

Ghosh:"Polymer Science Fundamentals of Polymer Science Molecular Weights of Polymers", Sep. 21, 2006, XP055608363, Retrieved from the Internet:URL:http://nsdl.niscair.res.in/jspui/bitstream/123456789/ 406/2/Molecular%20weights%20of%20polymers.pdf [retrieved on Jul. 24, 2019].

Thomas: "GPC/SEC Practical Tips and Tricks", Oct. 1, 2011, XP055608344, Retrieved from the Internet: URL:https://www.agilent.com/cs/library/ slidepresentation/Public/GCC2011- Wksp_GPC_Tips-and-Tricks_Presentation.pdf [retrieved on Jul. 24, 2019].

International Search Report for PCT/KR2019/007555 (PCT/ISA/210) dated Sep. 26, 2019.

* cited by examiner

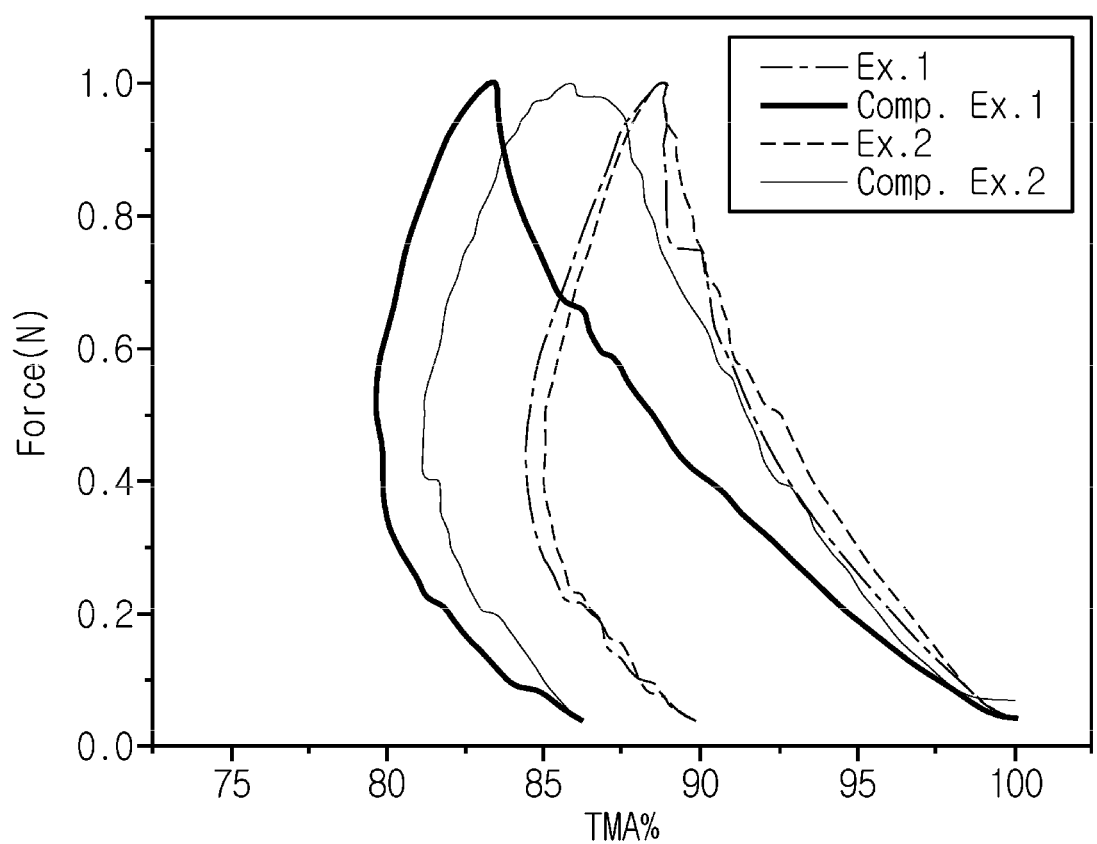

THIN POLYETHYLENE SEPARATOR WITH REDUCED COMPRESSIBILITY AND ELECTROCHEMICAL DEVICE INCLUDING THE SAME

TECHNICAL FIELD

The present application claims priority to Korean Patent Application No. 10-2018-0072384 filed on Jun. 22, 2018 in the Republic of Korea. The present disclosure relates to a separator for an electrochemical device, wherein the electrochemical device may be a primary battery or secondary battery and the secondary battery includes a lithium ion battery.

BACKGROUND ART

Polyolefin microporous membranes have been used widely for separators for batteries, such as lithium batteries, diaphragms for electrolytic condensers, moisture-permeable waterproof clothes, various filtering membranes, or the like. When using polyolefin microporous membranes as separators for batteries, performance thereof are closely related with the characteristics, productivity and safety of batteries. Therefore, it is required for separators, particularly those for lithium ion batteries, to have not only excellent mechanical properties and permeability but also a function (shut-down function) of interrupting battery reaction by closing micropores under heat emission upon abnormal states or a function (thermal shrinking resistance) of preventing a dangerous condition of direct reaction between a positive electrode material and a negative electrode material by retaining the shape even at high temperature, in order to prevent accidents, such as heat emission, ignition and rupture, of batteries caused by a short-circuit of an external circuit, overcharge, or the like.

In general, microporous membranes including polyethylene alone have a low meltdown temperature and microporous membranes including polypropylene alone have a high shutdown temperature. Therefore, there have been suggested separators for batteries including microporous membranes based on polyethylene and polypropylene.

For example, Japanese Patent No. 3235669 discloses a separator for a battery having excellent thermal shrinking resistance and shutdown property, and the separator has at least one first layer including a polymer selected from low-density polyethylene, ethylene-butene copolymer and ethylene-hexene copolymer, and at least one second layer including a polymer selected from high-density polyethylene, ultrahigh-molecular weight polyethylene and polypropylene.

Japanese Patent No. 3422496 discloses a separator for a battery having excellent shutdown property, and the separator has at least one first layer including a polymer selected from ethylene-butene copolymer, ethylene-hexene copolymer, ethylene-methacrylate copolymer and polyethylene, and at least one second layer including a polymer selected from polyethylene and polypropylene.

Japanese Patent No. 2883726 discloses a separator for a battery having excellent shutdown property and meltdown property, the separator being obtained by co-extruding polypropylene having a melting point of 150° C. or more and polyethylene having a melting point of 100-140° C., carrying out uniaxial orientation of the resultant laminate film at a temperature of −20° C. to [melting point of polyethylene (Tm0)−30]° C.), and further carrying out orientation in the same direction at a temperature of (Tm0−30)° C. to (Tm0−2)° C. to perform porosification.

Japanese Patent Laid-open No. Hei 11-329390 discloses a battery separator having excellent shutdown property and strength, and the separator includes a microporous membrane including two microporous strength-imparting layers made of a polypropylene material and an interrupting layer interposed between the two microporous strength-imparting layers and made of a filler-containing polyethylene material, wherein the interrupting layer made of a filler-containing polyethylene material is obtained by a particle orientation process.

Japanese Patent Laid-Open No. 2002-321323 discloses a polyolefin microporous membrane, which has a trilayer structure of membrane A/membrane B/membrane A or membrane B/membrane A/membrane B, and is obtained by stacking and integrating microporous membrane A essentially including polyethylene and polypropylene with polyethylene microporous membrane B.

However, the microporous membrane including polypropylene has a difficulty in forming a thin film and shows poor permeability or penetration strength. In addition, recently, in terms of properties of a separator, not only permeability or mechanical strength but also properties, such as cycle characteristics, related with battery life or properties, such as electrolyte injectability, related with battery productivity have been regarded as important.

Meanwhile, thin filming has been increasingly in demand in order to increase energy density of batteries. Thus, there has been suggested a polyethylene separator obtained by using a wet process including forming pores by using a plasticizer. However, due to the thin filming of a separator, it is not possible to incorporate a sufficient amount of insulation material to cause problems, such as degradation of insulation property or mechanical strength. Under these circumstances, there is a need for a separator having a small thickness while providing excellent insulation property.

DISCLOSURE

Technical Problem

The present disclosure is directed to providing a separator for an electrochemical device which has a high breakdown voltage and shows a decreased possibility of short-circuit generation. It will be easily understood that the objects and advantages of the present disclosure may be realized by the means shown in the appended claims and combinations thereof.

Technical Solution

In one aspect of the present disclosure, there is provided a separator for an electrochemical device. According to the first embodiment of the present disclosure, there is provided a separator for an electrochemical device including a porous substrate, wherein the porous substrate includes polyethylene; the porous substrate satisfies at least one of the following conditions a)-c), when the porous substrate is pressurized at 40° C. from 0.04 N to 1 N at a rate of 0.25 N/min and depressurized from 1 N to 0.04 N at the rate of 0.25 N/min: a) a compressibility of 15% or less when the pressure reaches 1 N, b) a maximum compressibility of 18% or less within the pressure range of 0.04 N to 1 N, and c) a permanent strain of 13% or less; the porous substrate has a porosity of 45% or less; and the polyethylene has a weight average molecular weight (Mw) of 300,000 to 1,000,000.

According to the second embodiment of the present disclosure, there is provided the separator for an electrochemical device as defined in the first embodiment, wherein the porous substrate further includes polypropylene in an amount of 0 wt % to 5 wt % based on 100 wt % of the porous substrate.

According to the third embodiment of the present disclosure, there is provided the separator for an electrochemical device as defined in the first or the second embodiment, wherein the porous substrate has a thickness of 5 μm to 20 μm.

According to the fourth embodiment of the present disclosure, there is provided the separator for an electrochemical device as defined in any one of the first to the third embodiments, wherein the polyethylene has a weight average molecular weight (Mw) of 300,000 to 500,000.

According to the fifth embodiment of the present disclosure, there is provided the separator for an electrochemical device as defined in any one of the first to the fourth embodiments, wherein the polyethylene has a weight average molecular weight (Mw) of 300,000 to 500,000, and wherein the porous substrate has a porosity of 45% or less and a compressibility of 15% or less.

According to the sixth embodiment of the present disclosure, there is provided the separator for an electrochemical device as defined in any one of the first to the fifth embodiments, wherein when a plurality of specimens of the separator are prepared, the percentage of specimens of the separator in which a short-circuit occurs at 75 V or less, is less than 1% based on the total number of specimens of the separator.

According to the seventh embodiment of the present disclosure, there is provided the separator for an electrochemical device as defined in any one of the first to the sixth embodiments, wherein the porous substrate has pores formed by removing a pore-forming agent from a mixture of a polymer resin with the pore-forming agent.

According to the eighth embodiment of the present disclosure, there is provided the separator for an electrochemical device as defined in any one of the first to the seventh embodiments, which further includes a heat resistant layer on at least one surface of the porous substrate, wherein the heat resistant layer includes a binder resin with inorganic particles, and each inorganic particle includes at least one of an oxide, or a hydroxide, and the oxide and hydroxide independently include at least one element selected from the group consisting of aluminum, magnesium, silicon, zirconium, calcium, strontium, barium, antimony, tin, zinc and rare earth elements.

According to the ninth embodiment of the present disclosure, there is provided the separator for an electrochemical device as defined in any one of the first to the eighth embodiments, which further includes a heat resistant layer on at least one surface of the porous substrate, wherein the porous substrate satisfies at least one of the conditions of a compressibility of 15% or less, a maximum compressibility of 17% or less, and a permanent strain of 15%.

According to the tenth embodiment of the present disclosure, there is provided a method for selecting a porous substrate of a separator for an electrochemical device, including the steps of: (S1) preparing a porous substrate including polyethylene, and polypropylene in an amount of 5 wt % or less, and having thickness of 5 μm to 20 μm; (S2) measuring at least one of compressibility, maximum compressibility and permanent strain of the porous substrate; and (S3) selecting the porous substrate that satisfies at least one of the conditions of a) a compressibility of 15% or less, b) a maximum compressibility of 18% or less, and c) a permanent strain of 13% or less.

According to the eleventh embodiment of the present disclosure, there is provided the separator for an electrochemical device as defined in the first embodiment, wherein the polyethylene is present in an amount of 80 wt % or more based on 100 wt % of the porous substrate.

Advantageous Effects

The separator according to the present disclosure includes a porous substrate made of a porous polymer film having an excellent compressibility and permanent strain, wherein the porous substrate has excellent physical strength and durability, and ensures a high breakdown voltage while using a heat resistant layer having a small thickness. Thus, the separator according to the present disclosure shows a low possibility of short-circuit generation.

In addition, the separator according to the present disclosure may further include a heat resistant layer including inorganic particles, on the surface of the porous substrate. Herein, it is possible to further improve the compressibility, maximum compressibility and permanent strain characteristics depending on types of inorganic particles.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

The FIGURE shows the results of thermomechanical analysis (TMA) of Examples and Comparative Examples.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part [includes] an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

In one aspect, there is provided a separator for an electrochemical device. Herein, the electrochemical device is a system in which chemical energy is converted into electrical energy through electrochemical reactions, has a concept including a primary battery and a secondary battery, wherein the secondary battery is capable of charging and discharging and has a concept covering a lithium ion battery, nickel-cadmium battery, nickel-metal hydride battery, or the like.

Separator

The separator according to the present disclosure functions as an ion-conducting barrier which allows ions to pass therethrough while interrupting an electrical contact between a negative electrode and a positive electrode. The separator has a plurality of pores formed therein, and the pores are interconnected preferably so that gases or liquids may pass from one surface of the substrate to the other surface of the substrate. The separator according to the present disclosure includes a porous substrate including a plurality of pores. In addition, the separator may include a heat resistant layer formed on at least one surface of the porous substrate, if necessary. According to the present disclosure, the porous substrate includes a polymer material and the heat resistant layer includes inorganic particles and a binder resin.

According to the present disclosure, the porous substrate has a small thickness and high porosity, while satisfying a desired range of compressibility, maximum compressibility and permanent strain. The separator including the porous substrate shows excellent voltage resistance and has an effect of reducing generation of a short-circuit. In addition, when the separator is provided with a heat resistant layer, there is provided an effect of improving physical strength, shrinking property, heat resistance, or the like. According to an embodiment of the present disclosure, the heat resistant layer may have a porous structure formed by the interstitial volumes in the inorganic particles. Such a porous structure provides an effect of improving electrolyte holding capability. Meanwhile, according to an embodiment of the present disclosure, the heat resistant layer uses inorganic particles having heat-absorbing property so that the compressibility, maximum compressibility and permanent strain may be increased, resulting in improvement of resistance against a short-circuit.

According to an embodiment of the present disclosure, when the separator includes a heat resistant layer, the heat resistant layer may be present in an amount of 3-40 vol % based on 100 vol % of the total volume of the separator. In addition to this or independently from this, the heat resistant layer may have a thickness corresponding to 5-50% based on 100% of the total thickness of the separator.

Porous Substrate

According to the present disclosure, the porous substrate includes a polymer having electrical insulation property, and preferably includes a thermoplastic resin with a view to imparting a shut-down function. Herein, the term 'shut-down function' means a function of preventing thermal runaway of a battery by allowing a polymer resin to be molten so that the pores of the porous substrate may be closed and ion conduction may be interrupted, when the battery temperature is increased. As a thermoplastic resin, a thermoplastic resin having a melting point less than 200° C. is suitable, polyolefin being particularly preferred. For example, the polyolefin-based polymer resin may include polyethylene, polypropylene, polypentene or at least two of them, preferably polyethylene.

According to the present disclosure, the porous substrate may have a thickness of 5-20 μm in terms of thin filming of an electrochemical device and an increase in energy density. When the porous substrate has a thickness smaller than the above-defined range, it cannot perform a function as a conducting barrier sufficiently. On the contrary, when the porous substrate has a thickness excessively larger than the above-defined range (i.e. the porous substrate is excessively thick), the separator may show excessively increased resistance.

According to an embodiment of the present disclosure, the porous substrate includes polyethylene. According to the present disclosure, 'polyethylene' may include at least one of ultrahigh-molecular weight high-density polyethylene (UHMWHDPE), high-molecular weight polyethylene (HMWPE), high-density polyethylene (HDPE), low-density polyethylene (LDPE) and homogeneous linear and linear low-density polyethylene (LLDPE). Herein, 'high-molecular weight polyethylene (HMWPE)' may refer polyethylene having a weight average molecular weight (Mw) of 100,000-1,000,000. In addition, 'ultrahigh molecular weight' may refer to a weight average molecular weight (Mw) larger than about 1,000,000 and equal to or less than about 7,000,000.

According to an embodiment of the present disclosure, the porous substrate made of a polymer material satisfying the above-defined range of thickness may be obtained by using polyethylene through a wet process.

Meanwhile, according to an embodiment of the present disclosure, the porous substrate may include polyethylene, and may further include polypropylene, if necessary. Herein, the content of polypropylene is 0-5 wt % based on 100 wt % of the substrate. For example, the content of polypropylene is less than 5 wt %. Meanwhile, according to an embodiment of the present disclosure, polyethylene may have a weight average molecular weight (Mw) of 300,000-1,000,000, preferably 300,000-500,000, in terms of realization of the above-defined range of compressibility.

According to an embodiment of the present disclosure, the porous substrate may include polypropylene but the content of polypropylene may be controlled to 5 wt % or less, particularly less than 5 wt %, in the porous substrate. As the content of polypropylene is increased, the polymer has a lower degree of crystallization, and thus causes no degradation of compressibility or permanent strain even when the porosity is high and the penetration strength is low, and can maintain a low Hi-Pot defect ratio suggesting voltage resistance. However, when the content of polypropylene is not within the above-defined range, pores cannot be formed well in the porous substrate during the manufacture thereof through a wet process due to chemical instability, thereby making it difficult to develop porous property. Thus, it is preferred that the content of polypropylene is controlled suitably within the above-defined range.

In addition, when the content of polypropylene is high, a wet process is favorable as compared to a dry process in order to obtain a porous substrate having well-developed pores. However, when using a dry process, it is difficult to control the porous substrate to have a small thickness, as compared to a wet process.

Meanwhile, according to an embodiment of the present disclosure, the porous substrate may further include at least one polymer resin, such as polyethylene terephthalate, polybutylene terephthalate, polyacetal, polyamide, polycarbonate, polyimide, polyetheretherketone, polyethersulfone, polyphenylene oxide, polyphenylene sulfide or polyethylene naphthalene, if necessary.

Meanwhile, according to an embodiment of the present disclosure, the porous substrate may be a porous polymer film obtained by the following method, and may be a monolayer film or multilayer film formed by lamination of two sheets of films.

According to an embodiment of the present disclosure, the porous substrate may have a penetration strength of 450 gf or more with a view to improvement of production yield. According to an embodiment of the present disclosure, the penetration strength refers to the maximum penetration load (go as determined by carrying out a penetration test by using Instron UTM system under the conditions of a needle tip radius of curvature of 0.5 mm and a penetration rate of 50 mm/sec.

Meanwhile, according to an embodiment of the present disclosure, the porous substrate of the separator according to the present disclosure may have a) a compressibility of 15% or less, when it is pressurized under a force of 1 N at 40° C. In addition to this or independently from this, the porous substrate may have b) a maximum compressibility of 18% or less, when it is pressurized under a force of 1 N at 40° C. In addition to this or independently from this, the porous substrate may have c) a permanent strain of 13% or less, when it is pressurized under a force of 1 N at 40° C. According to an embodiment of the present disclosure, the porous substrate may satisfy at least one of the conditions a), b) and c). According to an embodiment of the present disclosure, the porous substrate may satisfy the conditions a), b) and c).

According to an embodiment of the present disclosure, the compressibility, maximum compressibility and permanent strain may be determined by using an apparatus for thermomechanical analysis (TMA), such as Q400, in a compression mode. A porous substrate specimen having a predetermined size is prepared, a hemispherical tip is placed on the specimen, and then compressibility, maximum compressibility and permanent strain may be determined, while pressure is increased from 0.04 N to 1 N at a rate of 0.25 N/min at a temperature of 40° C. and is decreased from 1 N to 0.04 N at the same rate. In other words, the volume change (Formula 1) when pressure reaches 1 N is taken as compressibility and the highest volume change (Formula 2) is determined within the total pressure range and taken as the maximum compressibility, and the final volume change (Formula 3) of the specimen recovered after compression is determined and taken as permanent strain. For example, the specimen may have a size of 10 mm×10 mm. Each of the volume changes is defined by any one of Formula 1 to Formula 3. In each formula, the difference between the volume of a strained specimen and the initial volume of the specimen is calculated as an absolute value.

Compressibility (%)=(|Volume of specimen under 1 N pressure−Initial volume of specimen|/Initial volume of specimen)×100    [Formula 1]

Maximum compressibility (%)=(|Volume of maximally strained specimen−Initial volume of specimen|/Initial volume of specimen)×100    [Formula 2]

Permanent strain (%)=(|Volume of specimen recovered after compression−Initial volume of specimen|/Initial volume of specimen)×100    [Formula 3]

According to the present disclosure, the separator satisfying the above conditions provides a battery with improved voltage resistance, thereby providing an increased breakdown voltage and a reduced ratio of short-circuit generation (Hi-Pot defect ratio) even under a high-voltage condition.

Meanwhile, according to the present disclosure, 'breakdown voltage' means the highest voltage capable of being endured by an insulator, and 'breakdown' means that an insulator is broken and loses insulation property above a certain value of voltage when applying voltage thereto.

According to an embodiment of the present disclosure, the voltage resistance may be determined by a method for measuring the breakdown voltage of a separator. Particularly, a voltage, where breakdown occurs, may be determined, when a separator as an insulator is disposed between two conductors and voltage is applied thereto.

For example, the breakdown voltage may be determined by using AC/DC/IR Hi-Pot tester. A porous substrate is disposed between an aluminum lower jig and a cylindrical electrode rod, and a DC current of 0.5 mA and a voltage increase of 100 V/s (voltage 3 kV, ramp up time 30 s) are set. When starting the test, voltage is increased and determination is stopped when a short-circuit occurs, and then the voltage at that time is defined as 'breakdown voltage'.

According to an embodiment of the present disclosure, evaluation of short-circuit generation (Hi-Pot defect ratio) is based on a breakdown voltage of 75 V, and refers to a ratio (%) of the number of specimens in which a short-circuit occurs under a condition of 75 V or less based on the total number of tested specimens. In the separator according to the present disclosure, it is preferred that the ratio (%) of the number of specimens in which a short-circuit occurs at 75 V or less is less than 1% based on the total number of specimens.

Meanwhile, the compressibility and permanent strain may be affected by the penetration strength and porosity of the porous substrate. For example, when the porous substrate has higher penetration strength and lower porosity, it satisfies the above-defined compressibility and permanent strain conditions.

According to an embodiment of the present disclosure, the porous substrate may have a porosity controlled adequately within a range of 30-70%. According to the present disclosure, the porosity may be 60% or less, 50% or less, 45% or less, or 40% or less, preferably. According to an embodiment of the present disclosure, the porosity may be controlled to about 45% or less in order to realize a desired range of compressibility, such as the condition of a compressibility of 18% or less. The term 'porosity' means a ratio of volume occupied by pores based on the total volume of a given structure, is expressed in the unit of %, and may be used interchangeably with the term of pore ratio or porous degree. According to the present disclosure, the porosity may be determined by any method with no particular limitation. For example, the porosity may be determined by using the Brunauer-Emmett-Teller (BET) method or Hg intrusion porosimetry. According to an embodiment of the present disclosure, the net density of an electrode active material layer is calculated from the density (apparent density) of a finished electrode (electrode active material layer) and the compositional ratio of ingredients contained in the electrode (electrode active material layer) and density of each ingredient. Then, the porosity of an electrode active material layer may be calculated from the difference between the apparent density and the net density.

According to an embodiment of the present disclosure, the porous substrate may be formed to have a monolayer structure or a laminate structure of two or more layers, as long as it has the above-described characteristics. When two or more layers are laminated, each layer preferably has the above-described characteristics in terms of materials. In addition, the laminated structure should satisfy a final thickness of 5-20 μm.

Method for Manufacturing Porous Substrate

According to an embodiment of the present disclosure, the porous substrate may be obtained by a method for forming a polymer film, preferably a wet process. For example, the wet process includes the steps of: (S1) preparing a mixture; (S2) forming an extruded sheet; (S3) forming a film; (S4) removing a pore-forming agent; and (S5) carrying out orientation-relaxation of the film.

In step (S1), a suitable type of polymer resin is selected depending on final properties of a separator, and the selected polymer resin is mixed with a pore-forming agent. The polymer resin is the same as the polymer resin of a porous substrate as described above. For example, the polymer resin may be a polyolefin-based resin. Particular examples of the polyolefin-based resin may include any one selected from polyethylene, such as high-density polyethylene, linear low-density polyethylene, low-density polyethylene or ultrahigh-molecular weight polyethylene, polypropylene, polybutylene and polypentene, or a mixture of two or more of them.

The pore-forming agent is a material dispersed in the polymer, imparting heterogeneity to the substrate prepared through extrusion, orientation, or the like, and removed from the substrate subsequently. Therefore, the portion of the substrate, where the pore-forming agent is positioned, is left in the form of pores. The pore-forming agent is a material present preferably in a liquid state during extrusion, but may be a material maintaining a solid state. The pore-forming agent may include an aliphatic hydrocarbon solvent, such as liquid paraffin, paraffin oil, mineral oil or paraffin wax; vegetable oil, such as soybean oil, sunflower oil, rapeseed oil, palm oil, coconut oil, corn oil, grape seed oil or cottonseed oil; or a plasticizer, such as dialkyl phthalate. Particularly, the plasticizer may include di-2-ethylhexyl phthalate (DOP), di-butyl-phthalate (DBP), di-isononyl phthalate (DINP), di-isodecyl phthalate (DIDP), butyl benzyl phthalate (BBP), or the like. Among them, liquid paraffin (LP, also referred to as liquid-state paraffin) is preferred.

In addition, the content of the pore-forming agent may be controlled adequately in order to realize a desired level of porosity, when manufacturing the separator. A higher content of pore-forming agent is preferred considering improvement of air permeability, but an excessive amount of pore-forming agent may adversely affect the strength of the finished substrate. Therefore, the content of the pore-forming agent may be 1-80 wt % based on 100 wt % of the total amount of the polymer resin with the pore-forming agent. If necessary, the content of the pore-forming agent may be controlled to 70 wt % or less, 60 wt % or less, or 50 wt % or less, and 1 wt % or more, 20 wt % or more, or 40 wt % or more, within the above-defined range. Meanwhile, according to an embodiment of the present disclosure, the pore-forming agent may be used in an amount of 1-60 wt % based on the total weight of the polymer resin with the pore-forming agent in order to realize a suitable level of porosity, such as a porosity of about 45% or less, of the porous substrate.

Next, the mixture prepared from the preceding step is extruded through an extruder. The extruder is not particularly limited and may be an extruder used conventionally in the art. Non-limiting examples of the extruder include an extruder equipped with a T-die or tubular die. The extrusion process may be carried out at an extrusion temperature used currently, but is carried out preferably at a temperature higher than the melting point of the polymer resin by 10-100° C. When the extrusion temperature is excessively higher than the above-defined range, it is difficult to form a film due to the thermal degradation of the polymer resin and the mechanical properties of the finished substrate are degraded undesirably. Extruded sheets may be obtained through the extrusion process.

Next, the extruded sheets are introduced to an orientation process. The orientation process is carried out by using a currently used orientation machine. The orientation machine that may be used includes a sequential biaxial orientation machine, but is not limited thereto. It is possible to increase the mechanical strength of the porous substrate through the orientation of the extruded sheets. The orientation process is carried out in the machine direction (MD, longitudinal direction) and/or transverse direction (TD, vertical direction). Through the orientation in either direction or both directions, it is possible to increase the tensile strength in the corresponding direction. If necessary, the separator according to the present disclosure may be subjected to orientation in ether of the machine direction (MD) and the transverse direction (TD) (e.g. uniaxial orientation), or in both of the machine direction (MD) and the transverse direction (TD) (e.g. biaxial orientation), sequentially or at the same time.

Then, the pore-forming gent is removed from the resultant product of step (S3). The pore-forming agent is removed through extraction using a solvent and drying. After removing the pore-forming agent, the spaces occupied by the pore-forming agent become pores. The solvent that may be used for extraction of the pore-forming agent is any solvent capable of extracting the pore-forming agent, but preferably includes a solvent, such as methyl ethyl ketone, methylene chloride or hexane, having high extraction efficiency and a high drying rate. Preferably, the solvent may be methylene chloride, such as methylene dichloride (MC). The extraction may be carried out by using any conventional solvent extraction process, such as an immersion process, solvent spray process or ultrasonication process, and such extraction processes may be used alone or in combination.

After extracting the pore-forming agent, a thermal fixing step is carried out. It is possible to obtain a finished separator having desired physical properties, porosity and air permeability through the thermal fixing step. The thermal fixing step may be carried out by using a heating system, such as oven, capable of applying temperature suitable for thermal fixing. Particularly, the film dried from the preceding step is subjected to thermal fixing in order to reduce the shrinkage of the finished film by removing the stress remaining in the film. The thermal fixing includes fixing a film and applying heat thereto so that the film to be shrunk may be fixed forcibly and the residual stress may be removed. A higher thermal fixing temperature is preferred in terms of reducing the shrinkage. However, when the thermal fixing temperature is excessively high, the film is partially molten so that the pores may be blocked and the permeability may be degraded. Preferably, the thermal fixing temperature is selected from such a temperature range that about 10-30 wt % of the crystalline portions of the film may be molten at the temperature. When the thermal fixing temperature is lower than the temperature where about 10 wt % of the crystalline portions of the film is molten, it is not possible to carry out reorientation of polyethylene molecules in the film sufficiently and to provide an effect of removing the residual stress from the film. When the thermal fixing temperature is higher than the temperature where about 30 wt % of the crystalline portions of the film is molten, the pores are blocked due to partial melting, resulting in degradation of permeability.

According to an embodiment of the present disclosure, the porous substrate may have a monolayer structure. In a variant, the porous substrate may be a laminate film formed by lamination of at least two sheets of films. Herein, at least one film contained in the laminate film may be formed by the above-described method.

Method for Selecting Porous Substrate

In another aspect, there is provided a method for selecting a porous substrate having high voltage resistance. There is an increasing need for thin filming of a separator for a secondary battery in order to increase the energy density of the battery. However, due to the thin filming of the separator, a sufficient amount of insulation material cannot be incorporated thereto, thereby causing the problem of degradation of insulation property or mechanical strength. For example, the separator may be deformed by the heat and pressure applied during the manufacture of an electrode assembly through stacking of electrodes and separators, thereby causing the problem of a decrease in breakdown voltage.

Under these circumstances, the inventors of the present disclosure have conducted many studies to ensure voltage resistance of a thin-film type separator and disclosed a method for selecting a separator, which is a porous polymer film, satisfies a thickness of 5-20 μm, and satisfies at least one of the following conditions a) to c), as a porous substrate for a separator:

a) a compressibility of 15% or less,
b) a maximum compressibility of 18% or less, and
c) a permanent strain of 13% or less.

Herein, the compressibility, maximum compressibility and permanent strain are determined as described above. In addition, according to an embodiment of the present disclosure, the porous substrate is obtained by the above-described method for manufacturing a porous substrate, includes polyethylene and may further include polypropylene, if necessary. Herein, the porous substrate satisfies the following conditions: the content of polyethylene is 80 wt % or more, or 90 wt % or more, based on 100 wt % of the porous substrate, and the content of polypropylene is 5 wt % or less, for example, less than 5 wt %. In addition, the porous substrate satisfies the condition of a porosity of 30-70%. The selected porous substrate satisfying the above-mentioned conditions has excellent voltage resistance, and can accomplish a high breakdown voltage and can reduce short-circuit generation (Hi-Pot defect ratio) significantly, when it is applied to the manufacture of a separator. See, the above description with reference to the voltage resistance, breakdown voltage and short-circuit generation.

Heat Resistant Layer

According to an embodiment of the present disclosure, the separator may include a heat resistant layer formed on at least one surface of the porous substrate. The heat resistant layer includes an adhesive binder resin and inorganic particles, has a plurality of micropores therein, wherein the micropores are interconnected, and shows structural characteristics as a porous layer so that gases or liquids may permeate from one surface to the other surface. According to an embodiment of the present disclosure, the heat resistant layer may include the binder resin and the inorganic particles at a weight ratio of 1:99-30:70. The ratio may be controlled adequately within the above-defined range. For example, the binder resin may be used in an amount of 1 wt % or more, 5 wt % or more, or 10 wt % or more, and the inorganic particles may be used in an amount of 80 wt % or more, 85 wt % or more, 90 wt % or more, or 95 wt % or more, based on 100 wt % of the total amount of the binder resin with the inorganic particles. According to the present disclosure, the heat resistant layer preferably has a porous structure with a view to ion permeability.

The heat resistant layer may be formed by binding the inorganic particles by means of the binder resin, wherein pores are formed by the interstitial volume among the inorganic particles. The interstitial volume is a space defined by the inorganic particles facing each other substantially in a closely packed or densely packed structure of the inorganic particles.

According to an embodiment of the present disclosure, the heat resistant layer may have a porosity of 30-70 vol %. Within the above-defined range, the porosity may be 35 vol % or more, or 40 vol % or more. In addition to this or independently from this, the porosity may be 65 vol % or less, or 60 vol % or less. For example, the porosity may be 40-60 vol %. When the porosity is 70 vol % or less, it is possible to ensure dynamic property with which a pressing process for adhesion with an electrode can be tolerated, and to prevent an excessive increase in surface opening, thereby facilitating adhesion. Meanwhile, when the porosity is 30 vol % or more, it is possible to provide preferred ion permeability.

Meanwhile, according to the present disclosure, the porosity may be determined by using BELSORP® (BET system) available from BEL JAPAN Co., or mercury intrusion porosimetry. According to an embodiment of the present disclosure, the net density of an electrode active material layer is calculated from the density (apparent density) of a finished electrode (electrode active material layer) and the compositional ratio of ingredients contained in the electrode (electrode active material layer) and density of each ingredient. Then, the porosity of an electrode active material layer may be calculated from the difference between the apparent density and the net density.

The heat resistant layer may have a thickness of 1-6 μm on one side of the porous substrate. Within the above-defined range, the heat resistant layer may have a thickness of 2 μm or more, or 3 μm or more, if necessary. Within the above-defined range, it is possible to obtain excellent adhesion with an electrode, thereby providing improved cell strength of a battery. Meanwhile, when the thickness is 6 μm or less, it is possible to provide a battery with preferred cycle characteristics and resistance characteristics. In this context, the thickness is preferably 4 μm or less, and more preferably 3 μm or less.

According to an embodiment of the present disclosure, the separator provided with the heat resistant layer may satisfy at least one of the following conditions a'), b') and c'):

a') a compressibility of 15% or less, 12% or less, or 10% or less,
b') a maximum compressibility of 17% or less, 15% or less, or 12% or less, and
c') a permanent strain of 15% or less, 12% or less, or 9% or less.

According to the present disclosure, the compressibility, maximum compressibility and permanent strain of the separator may be determined according to the above-described method for determining of the compressibility, maximum compressibility and permanent strain of the porous substrate.

According to the present disclosure, non-limiting examples of the binder resin that may be used for the heat resistant layer include any one polymer resin selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cyanoethylpullulan, cyanoethylpolyvinylalchol, cyanoethyl cellulose, cyanoethyl sucrose, pullulan and carboxymethyl cellulose, or a mixture of two or more of them. However, the scope of the present disclosure is not limited thereto.

According to an embodiment of the present disclosure, the inorganic particles that may be used for the heat resistant layer are not particularly limited, as long as they are electrochemically stable. In other words, the inorganic particles are not particularly limited, as long as they cause no oxidation and/or reduction in the operating voltage range (e.g. 0-5V based on $Li/Li^+$) of an applicable electrochemical device. Particularly, when using inorganic particles having a high dielectric constant, they contribute to an increase in dissociation degree of the electrolyte salt, particularly lithium salt, in a liquid electrolyte, and thus can improve ion conductivity of the electrolyte.

For these reasons, the inorganic particles may include high-dielectric constant inorganic particles having a dielectric constant of 5 or more, preferably 10 or more. Non-limiting examples of the inorganic particles having a dielectric constant of 5 or more may include $BaTiO_3$, $Pb(ZrTi)O_3$ (PZT), $Pb_{1-x}La_xZr_{1-y}Ti_yO_3$(PLZT, wherein $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $SiO_2$, $Y_2O_3$, $Al_2O_3$, SiC, $Al(OH)_3$, $TiO_2$, or mixtures thereof.

In addition, the inorganic particles that may be used for the heat resistant layer may be inorganic particles capable of transporting lithium ions, i.e. inorganic particles containing lithium elements, not storing lithium therein but transporting lithium ions. Non-limiting examples of the inorganic particles capable of transporting lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, $P_2S_5$-based glass ($Li_xP_yS_z$, $0<x<3$, $0<y<3$, $0<z<7$), such as $LiI$—$Li_2S$—$P_2S_5$, or mixtures thereof.

Meanwhile, according to an embodiment of the present disclosure, the heat resistant layer may include a hat-absorbing material as inorganic particles. The heat-absorbing material is less affected by the temperature applied during the formation of the heat resistant layer or lamination (e.g. hot pressing) of the separator with an electrode, and thus can prevent degradation of the compressibility of the separator.

Particular examples of the heat-absorbing material include oxides and/or hydroxides containing at least one element selected from the group consisting of aluminum, magnesium, silicon, zirconium, calcium, strontium, barium, antimony, tin, zinc and rare earth elements, but are not limited thereto. More particularly, the metal oxides include alumina, aluminum peroxide, tin-zinc oxides ($Zn_2SnO_4$, $ZnSnO_3$), antimony trioxide ($Sb_2O_3$), antimony tetraoxide ($Sb_2O_4$), antimony pentaoxide ($Sb_2O_5$), or the like. The metal hydroxides include aluminum hydroxide ($Al(OH)_3$), magnesium hydroxide ($Mg(OH)_2$), zinc tin hydroxide ($ZnSn(OH)_6$), or the like.

In addition, aluminum hydroxide, a type of metal hydroxide, is decomposed into $Al_2O_3$ and water ($H_2O$) by absorbing heat at a temperature of 200° C. or higher. Herein, aluminum hydroxide absorbs a heat energy of about 1,000 J/g. In addition, magnesium hydroxide absorbs a heat energy of about 1,300 J/g. Therefore, metal hydroxide can assist an effect of preventing degradation of the shrinkage of a separator through endothermic reaction, as soon as heat corresponding to the above-mentioned heat energy is generated in an electrochemical device.

In addition, there is no particular limitation in the average particle diameter ($D_{50}$) of the inorganic particles. However, the inorganic particles preferably have an average particle diameter of 0.3-1 μm for the purpose of formation of a coating layer having a uniform thickness and adequate porosity. When the average particle diameter is smaller than 0.3 μm, the inorganic particles may have low dispersibility in slurry prepared for preparing the heat resistant layer. When the average particle diameter is larger than 1 μm, the coating layer to be formed may have an increased thickness.

According to an embodiment of the present disclosure, the heat resistant layer may be formed by the method as described hereinafter. First, a binder resin is dissolved in a suitable organic solvent to prepare a polymer solution. The solvent preferably has a solubility parameter similar to the solubility parameter of the binder polymer to be used and has a low boiling point. This is because such a solvent facilitates homogeneous mixing and the subsequent solvent removal. Non-limiting examples of the solvent that may be used include acetone, tetrahydrofuran, methylene chloride, chloroform, dimethyl formamide, N-methyl-2-pyrrolidone, cyclohexane, water, or a mixture thereof.

Next, inorganic particles are added to and dispersed in the resultant polymer solution. According to the present disclosure, the ratio of the inorganic particles to the binder resin is the same as described above and may be controlled adequately considering the thickness, pore size and porosity of the finished heat resistant layer.

Then, the inorganic particle slurry is applied to at least one surface of the separator, followed by drying. There is no particular limitation in the method for coating the slurry on the porous substrate and any conventional coating method known in the art may be used. For example, various methods, such as dip coating, die coating, roll coating, comma coating or a combination thereof may be used.

During the drying, temperature and time conditions may be set adequately so that generation of surface defects on the surface of the composite porous layer may be minimized. A drying-aid system, such as a drying oven or hot air, may be used within a suitable range.

In addition, the separator according to the present disclosure may be obtained by preparing a heat resistant layer and a porous substrate separately, stacking the sheets, and forming a composite by hot pressing or adhesive. Methods for preparing the heat resistant layer as an independent sheet include a method including applying the slurry onto a release sheet, forming the heat resistant layer in the same manner as described above and removing only the heat resistant layer.

In another aspect, there is provided a secondary battery including the separator. The battery includes a negative electrode, a positive electrode and a separator interposed between the negative electrode and the positive electrode, wherein the separator is the low-resistance separator having the above-mentioned characteristics.

According to the present disclosure, the positive electrode includes a positive electrode current collector, and a positive electrode active material layer formed on at least one surface of the current collector and containing a positive electrode active material, a conductive material and a binder resin. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1-x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder resin. The negative electrode may include, as a negative electrode active material, any one selected from: lithium metal oxide; carbon such as non-graphitizable carbon or graphite-based carbon; metal composite oxides, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements of Group 1, 2 or 3 in the Periodic Table, halogen; $0 < x \leq 1$; $1 \leq y \leq 3$; $1 \leq z \leq 8$); lithium metal; lithium alloy; silicon-based alloy; tin-based alloy; metal oxides, such as AuO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, SUPER-P®, acetylene black, KETJEN BLACK®, channel black, furnace black, lamp black, thermal black, denka black, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder resin may be a polymer used currently for an electrode in the art. Non-limiting examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinylalchol, cyanoethyl cellulose, cyanoethyl sucrose, pullulan, and carboxymethyl cellulose.

The electrode assembly prepared as described above may be introduced to a suitable casing and an electrolyte may be injected thereto to obtain a battery.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compounds and mixtures thereof. However, the present disclosure is not limited thereto.

In addition, the present disclosure provides a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Porosity and Gurley Value

According to the present disclosure, porosity may be determined based on ASTM D-2873. Gurley values can be determined by using Gurley type Densometer (No. 158) available from Toyoseiki Co., according to the method of JIS (Japanese Industrial Standard) Gurley. In other words, the Gurley value means a time (second) required for 100 cc of air to pass through a porous substrate or separator having a size of 1 int under a constant air pressure of 4.8 inches.

Tensile Strength

The tensile strength of each of the porous substrates according to Examples and Comparative Examples can be determined by mounting each porous substrate to a UTM (tensile strength tester) and drawing it in MD (machine direction) and TD (transverse direction).

Particle Size Distribution

The average particle diameter of inorganic particles means the particle size ($D_{50}$) of 50% of the integrated value from a smaller particle diameter calculated based on the results of measurement of particle size distribution of the particles after the classification thereof using a conventional particle size distribution measuring system. For example, such particle size distribution can be determined after dispersing the inorganic particles sufficiently in aqueous solution by using a suitable laser diffraction or scattering type particle size distribution measuring system, followed by agitation with an ultrasonic dispersing device.

Specific Surface Area

Measurement of the BET specific surface area of inorganic particles may be carried out by the Brunauer-Emmett-Teller (BET) method. For example, a porosimetry analyzer (Bell Japan Inc., BELSORP®-II mini) may be used to determine the specific surface area by the BET 6-dot method through nitrogen gas adsorption flowmetry.

EXAMPLES

1. Preparation of Porous Substrate

High-density polyethylene and polypropylene were prepared, and liquid paraffin oil having a dynamic viscosity of 40 cSt at 40° C. was used as a diluent. Herein, high-density polyethylene and liquid paraffin oil were prepared at a weight ratio of 35:65. The weight average molecular weight of high-density polyethylene and content of polypropylene based on 100 wt % of the porous substrate are described in the following Table 1. The ingredients were introduced to a biaxial extruder and kneaded therein to provide a polyethylene solution and extrusion was carried out at a temperature of 135° C. The orientation temperature was 108° C. in the machine direction and 123° C. in the transverse direction, and the orientation ratio was 5.5 each in the machine direction and the transverse direction. Then, methylene chloride was used as an extraction solvent to extract liquid paraffin oil at 2 m/min, and thermal fixing was carried out at 128° C. to obtain a porous polyolefin film.

TABLE 1

|  | Example 1 | Comp. Ex. 1 | Example 2 | Comp. Ex. 2 |
| --- | --- | --- | --- | --- |
| Weight average molecular weight (Mw) | 370,000 | 350,000 | 370,000 | 280,000 |
| Content of polypropylene (wt %, content of polypropylene based on 100 wt % of porous substrate) | 4.8 wt % | 0 wt % | 4.7 wt % | 0 wt % |
| Thickness (μm) | 9.3 | 9.0 | 9.2 | 9.5 |
| Gurley value (sec/100 mL) | 110 | 64 | 181 | 140 |
| Porosity (vol %) | 41.5 | 56.3 | 33 | 33 |
| Penetration strength (gf) | 276 | 220 | 504 | 293 |
| Tensile strength (TD/MD, kgf/cm$^2$) | 1,010/980 | 940/1,000 | 2,400/2,100 | 1,720/1,260 |

2. Determination of Physical Properties of Porous Substrate

The physical properties of each porous substrate are shown in Table 1.

3. Determination of Compressibility, Maximum Compressibility and Permanent Strain of Porous Substrate The compressibility, maximum compressibility and permanent strain of each porous substrate were determined by using Q400 TMA apparatus (compression mode). Each of the separator specimens according to Examples and Comparative Examples was prepared with a size of 10 mm×10 mm. A hemispherical tip was places on the specimen, and pressure was increased from 0.04 N to 1 N at a rate of 0.25 N/min at a temperature of 40° C. and then reduced from 1 N to 0.04 N at the same rate. The volume change (compressibility) when pressure reached 1 N, the highest volume change (maximum compressibility) and the final vole change (permanent strain) of the specimen recovered after compression were determined. The results are shown in the following Table 2. The volume changes were calculated by using the above Formula 1 to Formula 3.

TABLE 2

|  | Ex. 1 | Comp. Ex. 1 | Ex. 2 | Comp. Ex. 2 |
| --- | --- | --- | --- | --- |
| Compressibility (%) | 11% | 17% | 11% | 14% |
| Maximum compressibility (%) | 16% | 20% | 15% | 19% |
| Permanent strain (%) | 10% | 14% | 10% | 14% |

In Example 1 and Comparative Example 1, Example 1 shows lower porosity, higher Gurley value to provide higher penetration strength or tensile strength. In addition, Example 1 shows higher compressibility, maximum compressibility and permanent strain. Therefore, it can be seen that the compressibility, maximum compressibility and permanent strain are affected by mechanical properties, such as penetration strength or tensile strength.

Meanwhile, Example 2 and Comparative Example 2 show a similar porosity value but Example 2 shows higher penetration strength or tensile strength. In addition, Example 2 shows higher compressibility, maximum compressibility and permanent strain. Therefore, it can be also seen from Example 2 and Comparative Example 2 that the compressibility, maximum compressibility and permanent strain are affected by mechanical properties, such as penetration strength or tensile strength. However, it is shown that the porosity or Gurley value is less related with the compressibility, maximum compressibility and permanent strain.

Therefore, it can be seen that it is difficult to control mechanical properties by adjusting porosity or Gurley value, and porosity or Gurley value is not sufficient as grounds of judging mechanical properties.

4. Determination of Voltage Resistance

First, 100 specimens were prepared for each of Examples and Comparative Examples and they were evaluated in terms of voltage resistance. The breakdown voltage was measured by using AC/DC/IR Hi-Pot tester. The separator according to each of Examples and Comparative Examples was disposed between an aluminum lower jig and a cylindrical electrode rod, and DC current was set to 0.5 mA and pressure was increased at 100 V/s (voltage 3 kV, ramp up time 30 s). When the test was started, voltage was increased. Then, measurement was stopped when a short-circuit was generated, and the voltage at that time was taken as breakdown voltage. Evaluation of short-circuit generation was based on 75 V, and the ratio (%) of the number of specimens causing a short-circuit under the condition of 75 V or less, based on the total number of tested specimens, was calculated.

TABLE 3

|  | Ex. 1 | Comp. Ex. 1 | Ex. 2 | Comp. Ex. 2 |
|---|---|---|---|---|
| Hi-Pot defect ratio (%) | 0.2% | 1.5% | 0.1% | 1.2% |

According to the test results (Table 3), it is shown that the voltage resistance is improved as the compressibility, maximum compressibility and permanent strain are increased.

Meanwhile, the FIGURE shows the thermomechanical analysis (TMA) results of each of the porous substrates according to Examples and Comparative Examples. It can be seen that the porous substrates according to Examples show a smaller volume change as compared to Comparative Examples.

Examples 3 and 4

First, 95 parts by weight of polyvinylidene fluoride-co-hexafluoropropylene (PVdF-HFP) was added to 95 parts by weight of acetone and dissolved therein at 50° C. for about 12 hours or more to prepare a binder solution. Next, inorganic particles were mixed with and dispersed in the polymer solution to a weight ratio of binder:inorganic particles of 15:85 to obtain slurry for a heat resistant layer. The slurry was applied to both surfaces of the porous substrate prepared from Example 1 through dip coating, followed by natural drying, to obtain a separator having a heat resistant layer.

TABLE 4

| Characteristics | | Ex. 3 | Ex. 4 |
|---|---|---|---|
| Inorganic particles | | Al(OH)$_3$ | Al$_2$O$_3$ |
| Average diameter of inorganic particles (D$_{50}$, μm) | | 0.8 | 0.5 |
| BET (m$^2$/g) | | 10-12 | 7-8 |
| Thickness of separator (μm) | | 13.1 | 13.8 |
| Gurley value (sec/100 mL) | | 172 | 178 |
| Shrinkage (%), allowed to stand in 120° C. oven for 30 minutes | MD | 2 | 5 |
| | TD | 1 | 4 |

TABLE 5

|  | Ex. 3 | Ex. 4 |
|---|---|---|
| Hi-pot defect ratio (%) | 0.05% | 0.14% |
| Compressibility (%) | 10% | 12% |
| Maximum compressibility (%) | 12% | 15% |
| Permanent strain (%) | 9% | 12% |

In Examples 3 and 4, the same porous substrate was used and different types of inorganic particles were used to form the heat resistant layers. As a result, it is shown that Example 3 shows better results in terms of compressibility, maximum compressibility and permanent strain. In addition, Example 3 shows higher voltage resistance as compared to Example 4. Therefore, it can be seen that the type of inorganic particles may affect the voltage resistance, in the case of a separator having a heat resistant layer. In Examples 3 and 4, the compressibility, maximum compressibility and permanent strain were determined in the same manner as Example 1.

What is claimed is:

1. A separator for an electrochemical device comprising: a porous substrate,
   wherein the porous substrate comprises polyethylene and polypropylene;
   wherein the porous substrate satisfies the following conditions a), b) and c), when the porous substrate is pressurized at 40° C. from 0.04 N to 1 N at a rate of 0.25 N/min and depressurized from 1 N to 0.04 N at the rate of 0.25 N/min:
   a) a compressibility of 15% or less when the pressure reaches 1 N,
   b) a maximum compressibility of 18% or less within the pressure range of 0.04 N to 1 N, and
   c) a permanent strain of 13% or less;
   wherein the porous substrate has a porosity of 45% or less; and
   wherein the polyethylene has a weight average molecular weight (Mw) of 300,000 to 500,000,
   the polyethylene is present in an amount of 80 wt % or more based on 100 wt % of the porous substrate, and
   the polypropylene is present in the porous substrate in an amount greater than 0 wt % up to 5 wt % based on 100 wt % of the porous substrate.

2. The separator for an electrochemical device according to claim 1, wherein the porous substrate has a thickness of 5 μm to 20 μm.

3. The separator for an electrochemical device according to claim 1, wherein the porous substrate has pores formed by removing a pore-forming agent from a mixture of a polymer resin with the pore-forming agent.

4. The separator for an electrochemical device according to claim 1,
   wherein the amount of polypropylene present in the porous substrate ranges from 4.7 wt % to 4.8 wt % based on 100 wt % of the porous substrate.

5. The separator for an electrochemical device according to claim 1, wherein when a plurality of specimens of the separator are prepared, a percentage of specimens of the separator in which a short-circuit occurs at 75 V or less, is less than 1% based on a total number of specimens of the separator.

6. The separator for an electrochemical device according to claim 1, which further comprises a heat resistant layer on at least one surface of the porous substrate, wherein the porous substrate satisfies each of the conditions of:
   the compressibility of 15% or less,
   the maximum compressibility of 17% or less, and
   the permanent strain of 12% or less.

7. The separator for an electrochemical device according to claim 1, which further comprises:
   a heat resistant layer on at least one surface of the porous substrate,
   wherein the heat resistant layer comprises a binder resin with inorganic particles, and
   wherein each inorganic particle comprises at least one of an oxide, or a hydroxide, and
   wherein the oxide and hydroxide independently comprise at least one element selected from the group consisting of aluminum, magnesium, silicon, zirconium, calcium, strontium, barium, antimony, tin, zinc and rare earth elements.

8. A method for selecting a porous substrate of a separator for an electrochemical device, comprising the steps of:
   (S1) preparing a porous substrate comprising polyethylene, and polypropylene, and having thickness of 5 μm to 20 μm;

(S2) measuring compressibility, maximum compressibility and permanent strain of the porous substrate; and
(S3) selecting the porous substrate that satisfies the conditions of:
a) a compressibility of 15% or less,
b) a maximum compressibility of 18% or less, and
c) a permanent strain of 13% or less, and
wherein the polyethylene has a weight average molecular weight (Mw) of 300,000 to 500,000, the polyethylene is present in an amount of 80 wt % or more based on 100 wt % of the porous substrate and the polypropylene is present in the porous substrate in an amount greater than 0 wt % up to 5 wt % based on 100 wt % of the porous substrate.

* * * * *